(12) United States Patent
Li et al.

(10) Patent No.: US 8,613,021 B2
(45) Date of Patent: Dec. 17, 2013

(54) PROVIDING SUGGESTIONS OF RELATED VIDEOS

(75) Inventors: Hongqiao Li, Bellevue, WA (US); Steve Beck, Bothell, WA (US); Michael M. Cameron, Redmond, WA (US); Alejandro Dominguez, Richmond (CA)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/486,371

(22) Filed: Jun. 1, 2012

(65) Prior Publication Data

US 2012/0239645 A1    Sep. 20, 2012

Related U.S. Application Data

(62) Division of application No. 12/652,482, filed on Jan. 5, 2010, now Pat. No. 8,209,316.

(51) Int. Cl.
*G06F 17/30* (2006.01)

(52) U.S. Cl.
USPC .............................................. 725/45; 725/47

(58) Field of Classification Search
USPC ..................................................... 725/45, 47
See application file for complete search history.

(56) References Cited

U.S. PATENT DOCUMENTS

| | | | | |
|---|---|---|---|---|
| 7,480,931 B2 * | 1/2009 | Weiss | ................ | 726/2 |
| 7,836,466 B2 * | 11/2010 | Marsh | ............. | 725/39 |
| 7,865,522 B2 * | 1/2011 | Purdy et al. | ................... | 707/790 |
| 7,885,971 B2 * | 2/2011 | Marsh | .......................... | 707/770 |
| 8,176,060 B2 * | 5/2012 | Hewitt et al. | ................. | 707/755 |
| 8,220,022 B1 * | 7/2012 | Pan et al. | ......................... | 725/46 |
| 2009/0006368 A1 * | 1/2009 | Mei et al. | .......................... | 707/5 |
| 2012/0284254 A1 * | 11/2012 | Garg et al. | .................... | 707/717 |

* cited by examiner

*Primary Examiner* — Kim Nguyen

(74) *Attorney, Agent, or Firm* — Shook, Hardy & Bacon LLP

(57) ABSTRACT

Methods are provided for identifying media files that are related to a user-selected media file. Initially, a first set of media files that have previously been determined to be related to the selected media file is identified. It is determined that the number of media files in the first set of media files does not exceed a minimum number. A query is constructed based on the title or description of the selected media file to locate more related media files. A media database is searched and the results are combined with the first set of media files to be displayed.

9 Claims, 7 Drawing Sheets

PROVIDING SUGGESTIONS OF RELATED VIDEOS

CROSS-REFERENCE TO RELATED APPLICATIONS

This application is a divisional of, and claims priority from, U.S. patent application Ser. No. 12/652,482, filed Jan. 5, 2010, entitled "PROVIDING SUGGESTIONS OF RELATED VIDEOS." U.S. patent application Ser. No. 12/652,482 is incorporated herein by reference in its entirety.

BACKGROUND

Various websites are available that allow users to search and select media files, such as videos, audio, images, or a combination thereof. For instance, there are many websites that allow users to upload videos, which are searchable by other users by way of queries. Other websites allow users to search large databases of videos and other media files, such as videos of recent news events, entertainment events, etc. Once a user locates and views a certain video or other media file on such a website, the user may lose interest and subsequently leave the website on which the video or other media file was found. A user may not be aware that other videos that are similar or relevant to the selected video can also be found on that website, or in some instances, the user may not wish to spend time locating these videos. These relevant videos may be of interest to the user, and in many cases, may keep the user engaged in the website on which the selected video was found.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying media files, including videos, audio, images, or a combination thereof, that are related to a target media file that has been selected by a user. For instance, a user may visit a website that allows for a search of videos. Once the user locates a video of interest, the user may select that video for viewing. An identification associated with the selected video is used to search for other videos previously determined to be related to the selected video. This is a first attempt to locate related videos. In one instance, if it is determined that a minimum quantity (e.g., four) of related videos has not been identified by the first attempt, a query is generated based on various aspects of the selected video, such as the title, description, category, known names in the title or description (e.g., celebrity name, TV show name), or the like. This query is used to search a media database. If the minimum quantity of related videos has still not been met, another, broader query is generated. This query is based on common words found in the title and description of the selected video. At least a portion of the returned videos are then presented to the user as suggested videos.

BRIEF DESCRIPTION OF THE DRAWINGS

The present invention is described in detail below with reference to the attached drawing figures, wherein.

DETAILED DESCRIPTION

Figure 1:
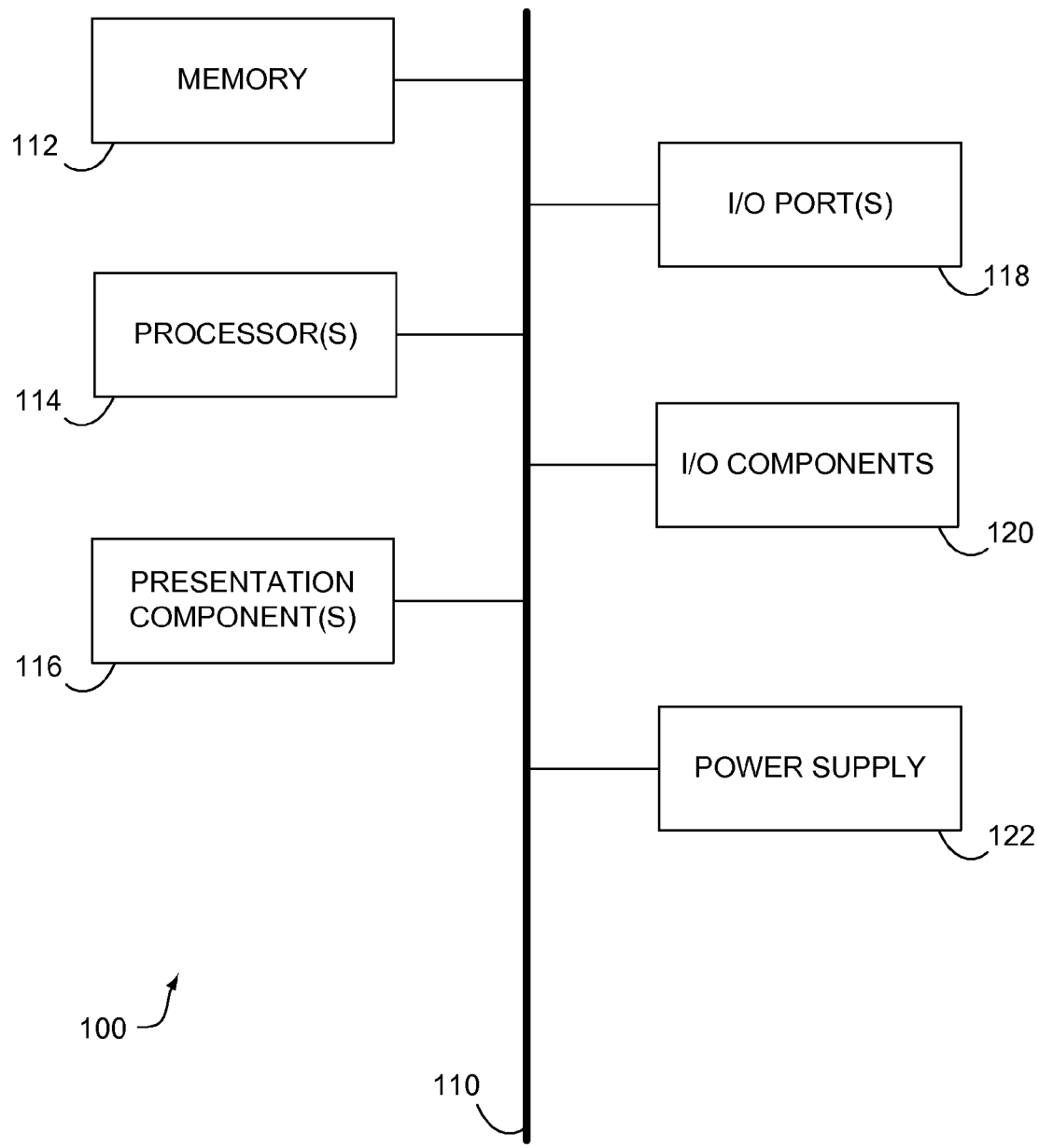
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for methods and computer-storage media for determining whether there are media files that are related or relevant to a media file selected by a user. For instance, if a user selects a video from a website to view, related videos or other media files are identified and communicated for display to a client device, such as the user's computer. These related videos may be displayed on a search results page, or on the same page as the video that is being viewed. This provides for even more videos that are likely of interest to the user from which the user may select. Various algorithms may be used to determine related videos. In one embodiment, two videos are related if they are both selected for viewing in response to one or more user-submitted queries. In another embodiment, two videos are related if both are selected by a user within a single user-session having a specified duration of time, such as fifteen minutes. To indicate the relevancy of the two videos, a relevancy score is calculated. The relevancy score is determined, at least, in part, by a number of users who have selected the two videos in response to the user-submitted query or within the single session. Relevancy scores calculated for different users are summed to calculate a final relevancy score. For instance, multiple users may select the same two videos in response to a query, even if the queries are different. Video identifications, such as a unique identifier associated with a video, may be stored in a database in pairs, indicating that the two videos in the pair are relevant. Associated relevancy scores are also stored. The relevancy scores are calculated each time the two videos are chosen and are summed. The most relevant video pairs (e.g., highest relevancy score) are more likely to be suggested to the user than the less relevant pairs.

Various algorithms will be described in detail herein. In one embodiment, a random walk algorithm and a session algorithm may both be applied to merged logs, such as search logs, to determine media files that are related. The random walk algorithm may also be applied to toolbar logs. As such, three separate results of related media files may be suggested. Once the related videos are determined for each of the three instances, the results are merged. In one embodiment, each instance of determining related media files is given equal weight. For instance, if each of the three determinations calculates a relevancy score, the scores are merged, but none is given more weight than any other.

Accordingly, in one aspect, an embodiment of the present invention is directed to one or more computer-storage media storing computer-useable instructions that, when used by one or more computing devices, cause the one or more computing devices to perform a method for associating related media file with one another. The method includes algorithmically determining that a first media file is related to a second media file. The first and the second media files are related if the first and the second media files are selected for viewing by a user in response to a user-submitted query, or the first and the second media files are selected by the user within a single session having a specified duration of time. The method further includes calculating a relevancy score that indicates a relevancy of the first media file in relation to the second media file and that is used to compare how related the first media file is to the second media file and to other media files that are determined to be related to the first media file. The relevancy score is determined in part by a number of users who have selected the first and the second media files in response to the user-submitted query or within the single session. Additionally, the method includes storing an identification of the first and the second media files and the associated relevancy score in a searchable database.

In another embodiment of the present invention, an aspect is directed to one or more computer-storage media storing computer-useable instructions that, when used by one or more computing devices, cause the one or more computing devices to perform a method for suggesting related media files to a user. The method includes receiving a user selection of a target media file, and identifying a first set of media files whose member media files have been determined to be related to the target media file. The first set of media files is identified for presentation to a user in response to the user selection of the target media file. The method further includes determining that a quantity of media files included in the first set of media files does not meet a minimum threshold of media files and constructing a query based on one or more of a title or a description of the target media file. Additionally, the method includes searching a media database, using the query, to identify a second set of media files, and communicating for display at least a portion of the media files included in the first set of media files and the second set of media files.

A further embodiment of the present invention is directed to one or more computer-storage media storing computer-useable instructions that, when used by one or more computing devices, cause the one or more computing devices to perform a method for suggesting related videos to a user. The method includes receiving an identification of a target video that a user has selected, and using a first query, identifying from a first database a first set of videos that have been determined to be related to the target video based on one or more of whether the target video and each video in the first set of videos has been selected by previous users during a single user-session having a specified duration of time, or a number of users who have selected both the target video and each video in the first set of videos in response to a search query. The method further includes determining that a quantity of videos in the first set of videos does not meet a minimum threshold of videos to present to the user, and identifying from a second database, using a second query, a second set of videos. The second query is generated based on one or more of a title or a description of the target video. The method additionally includes determining that the quantity of videos in the first set of videos and a quantity of videos in the second set of videos combined does not meet the minimum threshold of videos to present to the user, and using a third query, identifying from the second database a third set of videos. The third query is generated based on alphanumeric strings found in both the title and the description of the target video. The method also includes combining the videos in the first set, the second set, and the third set of videos to form a set of suggested videos. Any duplicate videos are removed. At least a portion of the set of suggested videos is then communicated for display.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
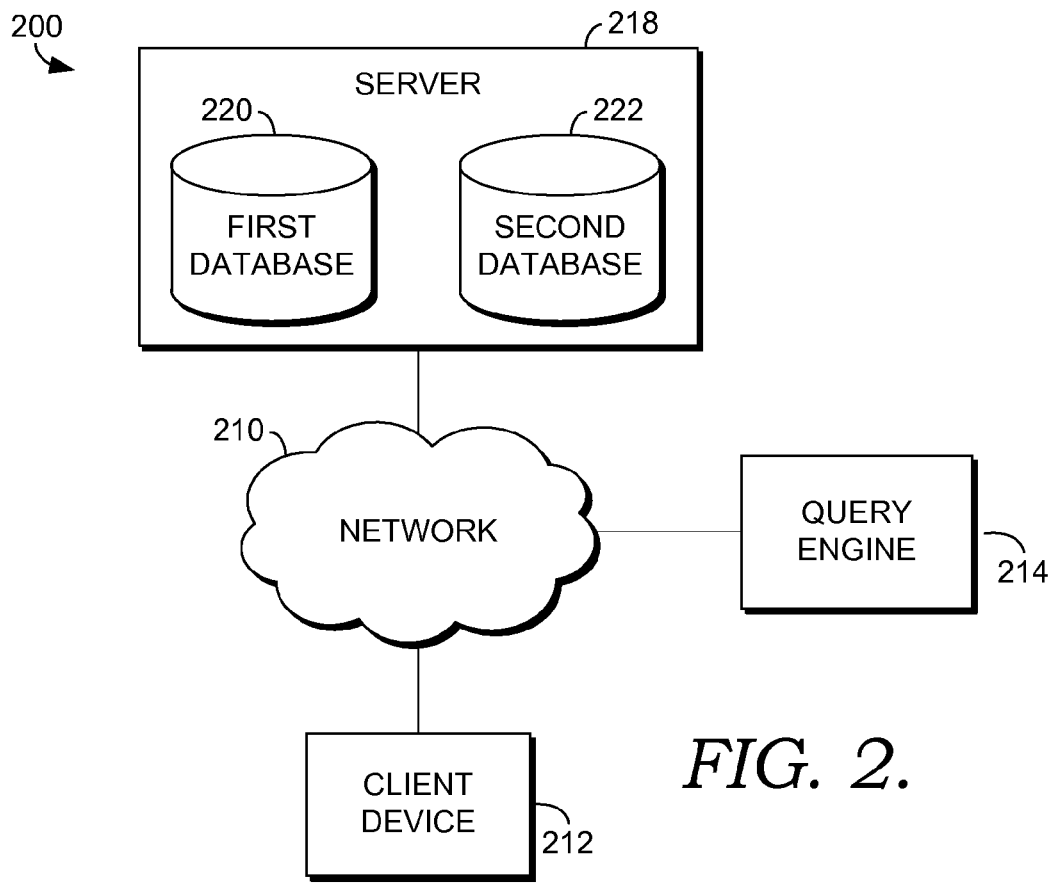
FIG. 2 is a block diagram of an exemplary networking system suitable for use in implementing embodiments of the present invention.

Turning to FIG. 2, a block diagram is shown of an exemplary networking system 200 suitable for use in implementing embodiments of the present invention. Various components are shown that allow for related media files to be identified and suggested to a user when that user selects a target media file for viewing. Various other arrangements of components and components not shown in FIG. 2 are contemplated to be within the scope of the present invention. FIG. 2 is provided merely as one example of components and an arrangement of those components that can be used to carry out aspects of the present invention.

Among other components not shown, the system 200 generally includes a client device 212, a server 218, and a query engine 214. The client device 212 may be any of a number of different types of devices owned and operated by a user, such as, for instance, a desktop computer, a laptop computer, or a mobile device, such as a phone or media player. In one embodiment, the client device 212 is the computing device 100 described with reference to FIG. 1. The components of the system 200 may communicate with each other via a network 210, which may include, without limitation, one or more local area networks (LANs) and/or wide area networks (WANs). Such networking environments are commonplace in offices, enterprise-wide computer networks, intranets, and the Internet. It should be understood that any number of client devices and servers may be employed within the system 200 within the scope of embodiments of the present invention. Each may comprise a single device or multiple devices cooperating in a distributed environment. For instance, the server 218 may comprise multiple servers arranged in a distributed environment that collectively provide the functionality of the server 218 described herein. Additionally, other components not shown may also be included within the system 200.

Generally, the system 200 illustrates an environment in which the client device 212 provides an indication of a user selection of a media file, such as a video, to the query engine 214, which queries various databases to identify other media files that have been determined to be related to the file selected by the user. Media files, as used herein, include video files, audio files, images, or the like. Further, a media file may include two or more types of media (e.g., a multimedia file), such as a video file having audio. The server 218 includes two databases. A first database 220 and a second database 222 are queried by the query engine 214 to identify media files that are related to the media file selected by the user. In one embodiment, the first database 220 stores data, such as suggested media file identification. In another embodiment, however, the data is stored in a single binary file (e.g., trie structure), and not in a database, as shown in FIG. 2. This data includes identifications of various media files and relevancy scores for pairs of media files. In one instance, an identification of a media file is a unique number associated with that media file. In one embodiment, data stored in the first database 220 is stored as a structure of identifications of pairs of media files. For instance, a first media file may be listed in a first column, and various identifications of media files that have been determined to be related to the first media file may be listed in a second column. A relevancy score for each pair (e.g., the first media file and each of the related media files) may be listed in a third column. Other ways of storing this data are also contemplated to be within the scope of embodiments of the present invention. For instance, as mentioned above, data may be stored in a single binary file (e.g., trie structure), and not in a database.

The second database 222 may be a searchable database, for example, that can be queried to identify media files that are related to a target media file. For instance, as will be discussed in greater detail, queries are generated in multiple ways, such as from a title of the media file, from a description of the media file, from a category associated with the media file, etc. These generated queries may be generated by the query engine 214, for example, and the query may be sent through the network 210 to the second database 222. The second database 222 may contain video files, audio files, images, etc., that can be retrieved and communicated for display in association with the client device 212. The query engine 214 may contain various algorithms that can be used to, among other things, determine relevancy of various media files, calculate relevancy scores for pairs of media files, and as discussed, generate queries.

In one embodiment, a user associated with the client device 212 selects a target media file. An identification of this media file is communicated through the network 210 to the query engine 214. The query engine 214 initially communicates the identification of the media file to the first database 220 to determine if any media files have already been determined to be related to the target media file. As will be discussed in greater detail, media files are determined to be related using several algorithms. The results are returned, in one instance, back to the query engine 214. In other instances, another component is utilized to receive results of queries. The query engine 214 then determines whether the number of media files returned exceeds a minimum threshold of media files. In one instance, the minimum threshold is four media files. In other instances, however, this number is either higher or lower than four. If the number of media files returned meets or exceeds the minimum threshold, at least a portion of the results are returned to the user. The number of results that are returned may be predetermined. For instance, in one embodiment, eight results have been determined to be the optimal number of suggested media files. The suggested media files, in one embodiment, are more relevant or more related to the target media file than other media files that are not suggested. As such, if there are many media files returned, only those that are the most relevant to the target media file are suggested to the user.

Further, media files that are determined to be duplicates of other media files are not suggested. A media file may be determined to be a duplicate of another media file if the length or size of the files is within a predetermined range. For instance, if a first video is one minute in length, and a second video is one minute and three seconds in length, the first and the second videos may be determined to be duplicates. The size of the files may be compared for image files that do not have a length. In one embodiment, the length or size of the files, combined with a finding that a set of sorted unique words in the titles of the videos are the same may lead to a determination that the files are duplicates. Returning to the example above, if the predetermined range is thirty seconds, then the first and second videos meet the first criteria for being duplicates. If the title of the first video is "Britney Spears" and the title of the second video is "Live Britney Spears in Washington," the set of sorted unique words is the same for both videos. In this case, the set of sorted unique words is {Britney, Spears}. As such, the two videos are determined to be duplicates of each other. In one embodiment, the media files that are found to be duplicates are stored and suggested to the user if a minimum threshold of media files is not met at the end of the process. In another embodiment, duplicate media files are discarded and not ever used as suggested media files. Other criteria may also be used to make a finding of duplicate media files in addition to or instead of the criteria described above. The criteria described above are not meant to be limiting but are provided for exemplary purposes only.

Moreover, in one embodiment, the titles of media files determined to be related are inspected to determine the cosine similarity between the titles. Cosine similarity essentially compares the words or alphanumeric strings in the titles to determine if the titles have one or more words in common. For example, if two titles do not have a single word in common, the cosine similarity is zero, and thus may not be considered related for purposes of embodiments of the present invention. However, in one instance, media files that have a cosine similarity of zero may be stored and used as suggested media files if a minimum threshold of media files cannot be met after attempting to identify related media files, as described herein. In many cases, media files having a cosine similarity of zero are considered "noise" and are stored for future use.

If the number of media files returned does not meet or exceed the minimum threshold, the query engine 214 attempts to find more results by generating a query. The query, in one embodiment, is gradually built. For example, the title of the media files may first be used as the query. If more results are needed, one or more words from the description of the media file are used. If the media file has an associated category (e.g., TV show, movie, trailer, news, comedy, drama), this can be used to constrain the query. Further, if the title or description contains a known name, such as a celebrity or name of a TV show, for instance, the known name is used to constrain the query. If the known name is used as the query, the results may be shuffled so that the same media files are not always suggested for a given celebrity or TV show. Additionally, one or more words in the query may be ignored if more results are needed. For instance, as the number of words in the title increases, the number of words ignored (e.g., relax count modifier) also increases. For exemplary purposes and not limitation, if there are four words in the title, the relax count is one. If there are more than seven words in the title, the relax count is two.

As described above, media files that are determined to be duplicates of other media files may not be suggested, at least initially. Further, a cosine similarity of the titles of two media files may be determined, and if it is zero, meaning that the titles do not have even one word in common, those media files are dropped. In one instance, the media files that are dropped and not suggested to the user are saved in storage for future use and may be suggested to the user if a minimum threshold of media files is not met using various methods described herein.

Again, it is determined whether a minimum threshold of media files has been returned as a result of the query or queries. If so, the results are returned to the user as suggested media files. If not, a last attempt is made to retrieve related media files. This last approach is generally more aggressive, as it tends to favor coverage over precision. Here, a Smith Waterman algorithm is applied, which is used to detect a meaningful substring between the title and the description of the media file. If a matching substring is found, it may be used as the query. For instance, if a title of a media file is "Britney Spears," and a description of the media file is "Britney Spears performs in Kansas," the matching substring is "Britney Spears," and this will be used as the query. Further, the relax count, as discussed above, may be increased such that more words in the title are ignored, thus producing a higher number of returned results. Again, duplicate media files may be determined and dropped from the list of suggested media files. The range used to determine whether two files are duplicates may be decreased, which produces a greater number of results and fewer media files that are dropped from the list of suggested media files.

Figure 3:
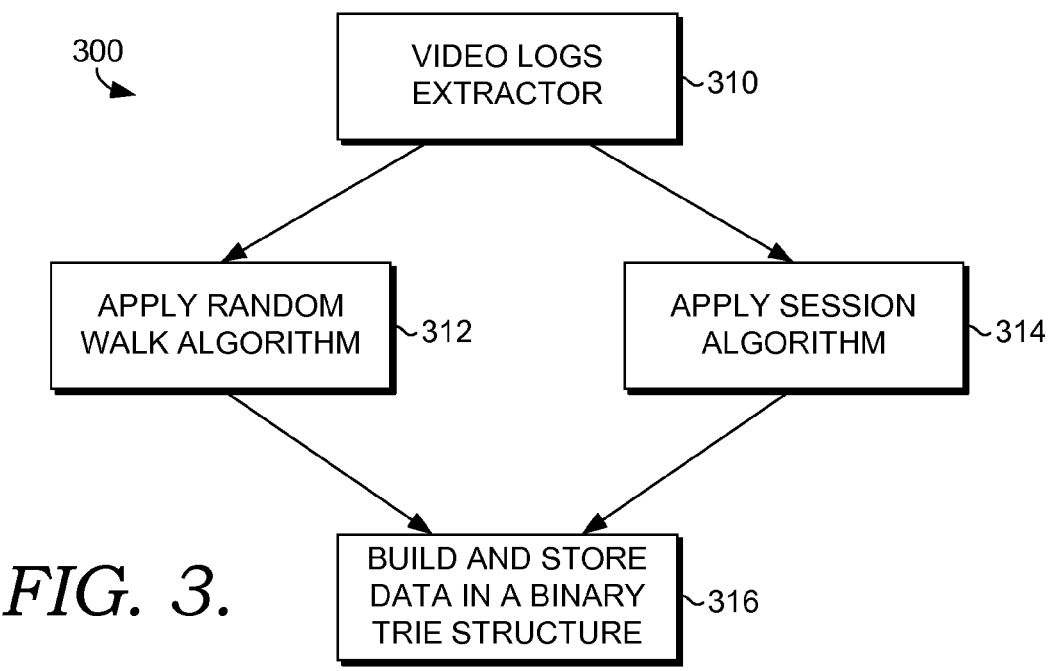
FIG. 3 is a flow diagram of a method for gathering data associated with related media files to store in a binary trie structure, in accordance with an embodiment of the present invention.

Referring now to FIG. 3, a flow diagram is illustrated of a method 300 for gathering data associated with related media files to store in a binary trie structure, in accordance with an embodiment of the present invention. Initially, at step 310, media logs are extracted so that only data that is necessary to determine which media files are related is retrieved from the media logs. Information that is included in a typical media log includes dates, the media files that are selected by various users, the query entered to return a particular media file, information to identify the media file (e.g., URL where the media file is located, identification of media file), client identification, time, settings, origin, language, etc. As only a portion of this information is necessary, and to prevent a database that is larger than necessary, the media logs are extracted so that only certain information is stored in the database. Media logs, as used herein, may include merged logs, search logs, toolbar logs, or the like. The information that is retrieved from the media logs may include, for example, the media files that have been selected by a user in a certain time frame, the media files that have been selected in response to a particular query, a number of instances that each media file has been selected by various users, a number of users who have selected each media file in response to a particular query, etc. This extraction may be done at regular intervals, such as once a day.

At steps 312 and 314, various algorithms are applied to the extracted data. A first algorithm, termed a random walk algorithm, is applied at step 312. Generally, the random walk algorithm determines related media files by identifying pairs of media files that have been selected in response to a query. Thus, for example, if a user submits a query for a certain video, and then proceeds to select video A, video B, and video C to view as a result of submitting the query, those three videos would be identified, in addition to the number of instances the user selects each video or the number of users who have selected each video (e.g., click counts). Then, if another user submits a different query and selects video A, video B, and video D, again, those videos are identified, in addition to the number of instances the user selects each video or the number of users who have selected each video. Videos are paired so that a relevancy score can be calculated for each pair. Using the previous example, videos A and B, videos B and A, videos B and C, videos C and B, videos A and C, and videos C and A are paired together for the first query. The number of instances, for example, that the user selected video A is multiplied by the number of instances that the user selected video B. Alternatively, the number of users who have selected video A is multiplied by the number of users who have selected video B, such that even if a single user selects video A in a single session or in response to a particular query multiple times, these multiple times will not be counted, which avoids skewing the relevancy scores, and discussed below. The product is the relevancy score for the pair of videos A and B. Once there are multiple users that select both videos A and B in response to a query, even if they are different queries, the relevancy scores are summed to produce a final relevancy score for the pairing of videos A and B. The final relevancy score may continually change as videos A and B are selected more times in response to various queries. This same process occurs for the other video pairs in the example above. The random walk algorithm will be further discussed with respect to FIG. 4.

At step 314, the session algorithm is applied, which generally takes into account a certain interval of time. The media files selected within that interval are identified as being related. The interval may vary, but in one embodiment, the interval of time is fifteen minutes. For example, if a particular user selects video A, video B, and video C within fifteen minutes, using the session algorithm, the related pairs of videos are as follows: videos A and B, videos B and A, videos B and C, videos C and B, videos A and C, and videos C and A. In one embodiment, the number of instances the user selected video A is multiplied by the number of instances that the user selected video B to get a relevancy score for the pair of videos A and B. In another embodiment, however, the number of instances that the user selects the videos is not used to determine a relevancy score. In this embodiment, it does not matter whether video A was selected one time or five times within the specified interval of time. Either way, a "1" is associated with that video. To get a relevancy score for videos A and B, for instance, one is multiplied by one to get a product of one, no matter how many times each video is selected. The relevancy score increases when videos A and B are selected in other intervals of time by either the same or different users. The session algorithm will be detailed in FIG. 5. In one embodiment, relevancy scores are calculated for various pairs of media files once a month, as opposed to each time that pair is selected by a user either in response to a query or in a single session. This consolidates the calculation of the relevancy scores, thus alleviating excess and unnecessary calculations.

At step 316, a binary trie structure is built so that the data can be stored. As pairs of related media files are identified, as outlined above, the data may be organized such that each video's identification (e.g., unique identifier) is stored along with the other videos' identifications with which it has been determined to be related. When the query engine searches for videos related to a target video, such as video A, returning to the examples given above, the identifications for those videos that have been determined to be related will be returned, and thus can be presented to the user. Relevancy scores associated with each pair may also be used to determine which related videos to return to the user. In one embodiment, the higher relevancy scores indicate a stronger relevancy than a lower relevancy score, and thus the more relevant media files are more likely to be selected as suggested media files.

Figure 4:
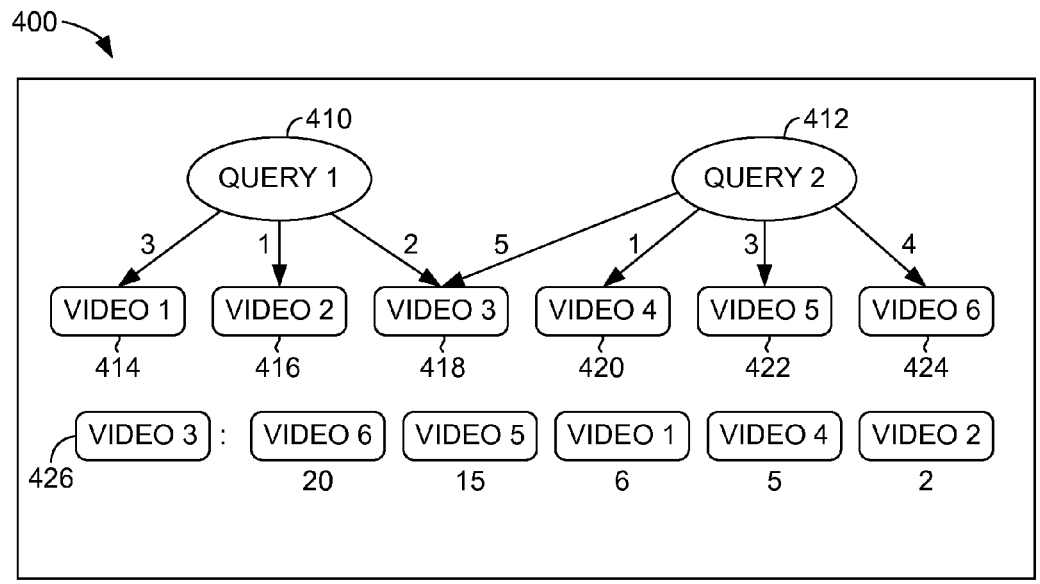
FIG. 4 is a block diagram of a first method used to determine related videos, in accordance with an embodiment of the present invention.

FIG. 4 is a block diagram 400 of a first algorithm used to determine related videos, in accordance with an embodiment of the present invention. The first algorithm, also referred to as the random walk algorithm, has been briefly described above. While any type of media file may be determined to be related using the random walk algorithm, the embodiment of FIG. 4 illustrates videos as the media files. In FIG. 4, query 1 (at block 410) and query 2 (at block 412) are issued. The queries may be issued by a single user or by multiple users. Further, query 1 (at block 410) and query 2 (at block 412) may be the same query (e.g., issued at different times, thus providing different results), or may be different queries. The issuance of query 1 (at block 410) results in video 1 (at block 414), video 2 (at block 416), and video 3 (at block 418). Similarly, the issuance of query 2 (at block 412) results in video 3 (at block 418), video 4 (at block 420), video 5 (at block 422), and video 6 (at block 424). The number of instances that each video has been selected by the issuer of query 1, query 2, or both queries 1 and 2 is determined. Alternatively, the number of users who have selected each video is determined and used as the click count. As shown, video 1 (at block 414) is selected three times by the issuer(s) of query 1, video 2 (at block 416) is selected one time by the issuer of query 1, video 3 (at block 418) is selected two times by the issuer of query 1 (at block 410), five times by the issuer of query 2 (at block 412), etc.

In an alternate embodiment, the number of instances that a particular video has been selected represents more than one user who has selected that particular video in relation to the issued query. For instance, query 1 (at block 410) may have been issued by three separate users. In this embodiment, all three users selected video 1 (at block 414), as indicated by the number "3" above block 414, one user selected video 2 (at block 416) and two of the three users selected video 3 (at block 418). Here, even if a single user selected video 1 (at block 414) multiple times, it is counted only as a single click or a single instance. The frequency of the query to the selected video is determined without taking into account the number of times that a single user selected a particular video. This avoids a single user skewing the scores by selected a particular video multiple times.

Item 426 illustrates how relevancy scores are calculated. Video 3 is found to be related to video 6, video 5, video 1, video 4, and video 2, as video 3 was selected along with video 1 (at block 414) and video 2 under query 1 (at block 410), and along with video 4 (at block 420), video 5 (at block 422), and video 6 (at block 424) under query 2 (at block 412). As such, the relevance score for video 3 in relation to video 6 is determined by multiplying the number of instances that video 3 is selected by the number of instances that video 6 is selected, which is five multiplied by four. Twenty is the relevancy score for this pair of videos, and this score is shown beneath the block identifying video 6. Relevancy scores are calculated for the remaining related videos in the same manner.

In one embodiment, multiple users issue the same query, such as query 1 (at block 410). The number of instances that the multiple users select each video is summed. For instance, a first user may select video 1 (at block 414) one time, a second user may select it one time, and a third user may select it one time. As such, the total number of instances that the three users have selected video 1 (at block 414) is three times, and thus the number "3" is displayed above block 414. The same may be done for the other videos shown in FIG. 4, and for query 2 (at block 412) and its associated videos.

Figure 5:
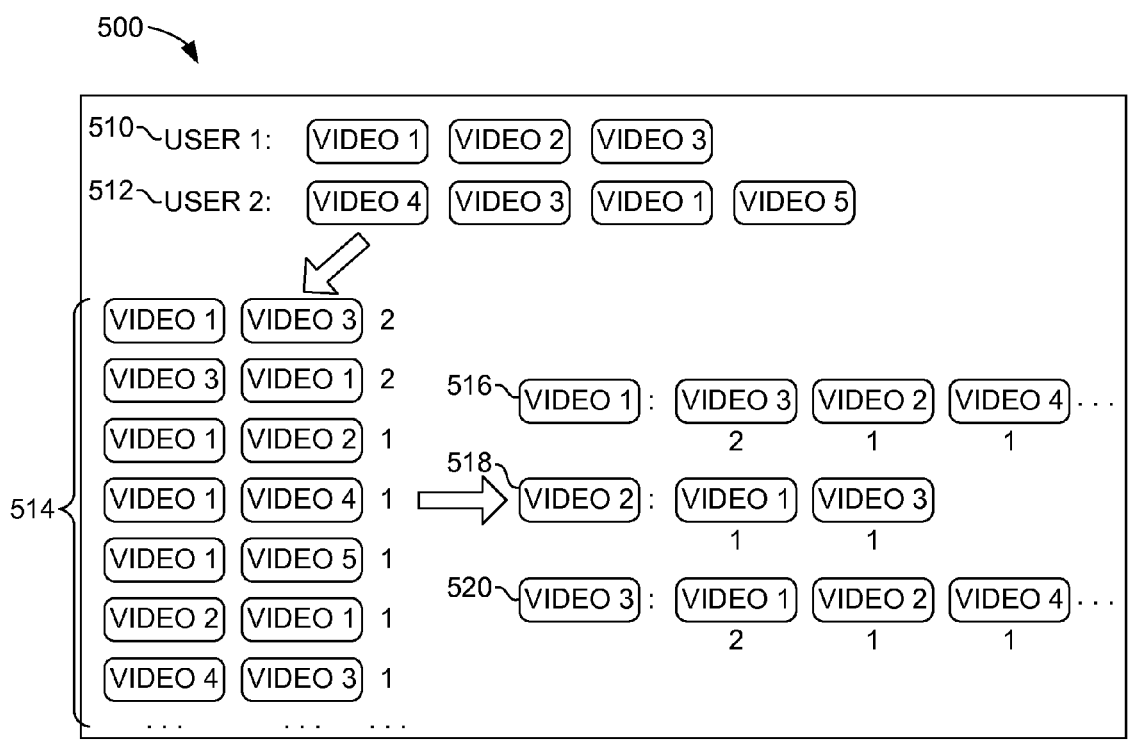
FIG. 5 is a block diagram of a second method used to determine related videos, in accordance with an embodiment of the present invention.

Turning to FIG. 5, a block diagram 500 is illustrated of a second algorithm used to determine related videos, in accordance with an embodiment of the present invention. The second algorithm, also called the session algorithm, relates media files based on the media files that are selected during a single session having a duration of a certain amount of time. In one embodiment, the duration is fifteen minutes, but other durations are contemplated to be within the scope of embodiments of the present invention. While any type of media files may be determined to be related using the session algorithm, the embodiment of FIG. 5 illustrates videos as the media files. In a single session, a user 1 510 selects videos 1, 2, and 3 to view. In another single session, user 2 512 selects videos 4, 3, 1, and 5 to view. Now, related videos can be determined. Item 514 illustrates a partial listing of video pairs that have been determined to be related. Initially, each video from user 1's 510 session can be paired together, including videos 1 and 3, videos 3 and 1, videos 1 and 2, videos 2 and 1, videos 2 and 3, and videos 3 and 2. The same can be done for user 2's 512 session.

While in one embodiment, the number of instances that users have selected each video is used to determine a relevancy score using the session algorithm, other embodiments consider only that a video has been selected, not the number of instances that it has been selected. As such, in FIG. 5, regardless of how many instances videos 1 and 3 have been selected by the user 1 510, the fact that each was selected is the only consideration accounted for here. As shown, user 1 510 selects videos 1 and 3 in a single session, and user 2 512 also selects videos 1 and 3 in a single session. In area 514, videos 1 and 3 and shown as a pair, with a number "2" shown nearby. The number "2" represents a relevancy score, which is derived by adding the number of times the pair was selected by different users. In the embodiment of FIG. 5, videos 1 and 3 were each selected by user 1 510 and user 2 512, and as such, one plus one equals two. In actuality, there may be hundreds, thousands, or even millions of instances when various users select the same two videos, such as videos 1 and 3 in a single session. FIG. 5 is simplified to clarify how the session algorithm operates, and similarly, to provide for a more simplified explanation.

Once the pairs of videos are listed along with the relevancy score, as shown in area 514, each video is listed along with each of its related videos. For instance, video 1 516 is related to videos 3, 2, 4, etc. Each of these videos is shown beside video 1 516 along with the relevancy score that has been calculated for each pair of videos. This is most similar to the format in which this data is stored so that it can be easily searched in the future. Video 2 518 is shown beside videos 1 and 3, to which video 2 518 is related. Similarly, video 3 520 is shown beside videos 1, 2, 4, etc., to which video 3 520 is related. Also, relevancy scores are indicated.

In one embodiment, both algorithms are applied to merged logs, which include the data stored in transaction logs of search engines. In other embodiments, one or more of the algorithms described herein is applied to toolbar logs or other logs that contain data that can be used to identify related media files. For instance, a toolbar log, as used herein, stores data pertaining to users' behavior on various websites. For instance, there are multiple websites available today that allow for users to search for media files (e.g., videos) of interest. Data regarding videos that a user selects in response to a query, for example, are stored in a toolbar log, and an algorithm, such as the random walk algorithm, may be applied to this data to determine videos that are related to each other. In one instance, the source company that is determining related media files to present to its users may not recognize a certain media file identification, and as such that particular media file may not be returned to a user as a related media file. In yet another embodiment, only a certain number of related media files are stored in the searchable database. For instance, fifteen media files may be the maximum number of files that are identified as being related to a certain media file.

Figure 6:
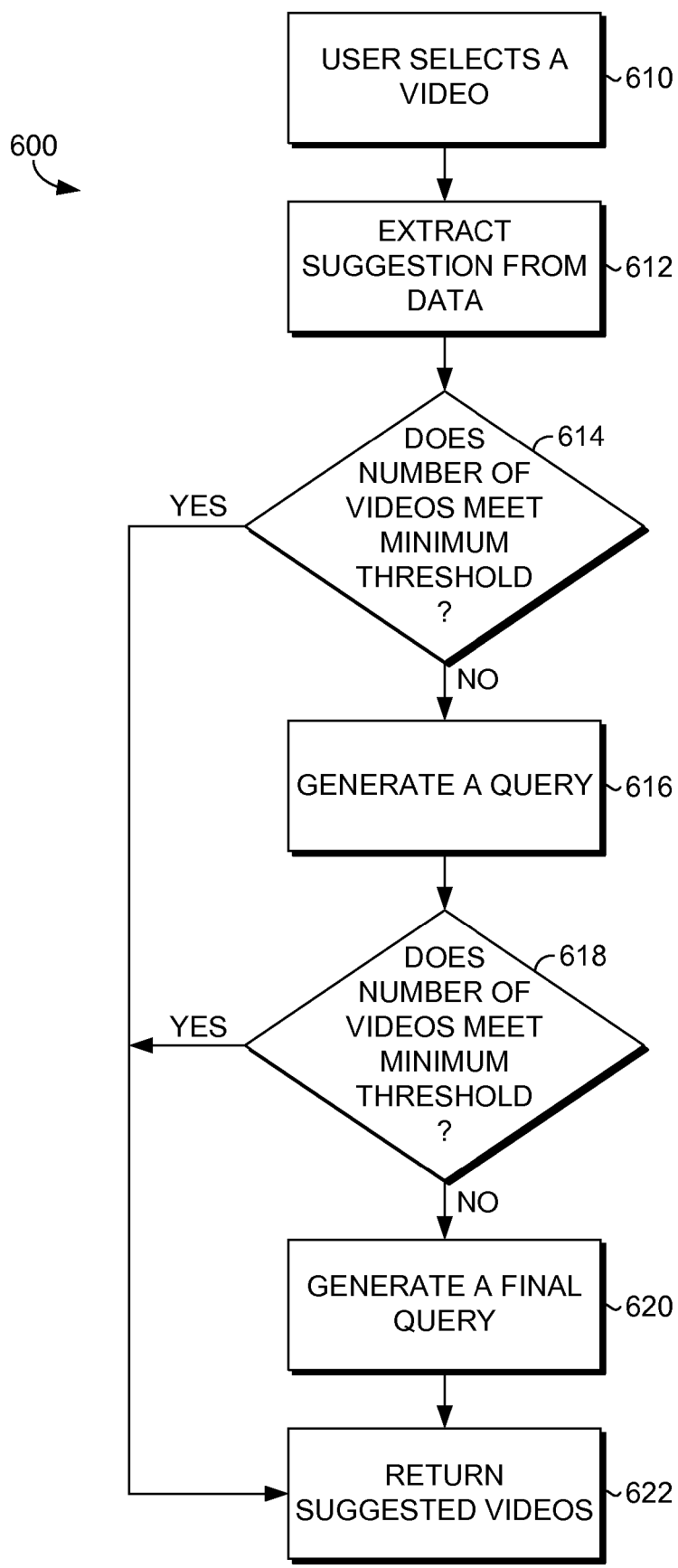
FIG. 6 is a flow diagram of a method for returning suggested media files, in accordance with an embodiment of the present invention.

FIG. 6 depicts a flow diagram of a method for returning suggested videos, in accordance with an embodiment of the present invention. Initially, a media file is selected by a user at step 610. Media files include video files, audio files, images, or those files containing similar data. Further, a media file includes two or more types of media (e.g., a multimedia file), such as a video file having audio. One or more suggested media files are then extracted from the data at step 612. The data may be stored in a searchable database. This data may include identifications of pairs of related media files and a corresponding relevancy score, wherein the pairs of media files have been determined to be related to one another. The process for determining relevant media files has been described herein with respect to FIG. 3. The data may be searched by, for instance, a submitted query that identifies the media file that the user has selected at step 610. At step 614, it is determined whether a quantity of media files that have been returned as a result of the extraction or querying of the data meets a minimum threshold of media files. The minimum threshold may be predefined and may vary. In one embodiment, the minimum threshold is four media files.

If the number of media files does meet the minimum threshold, the suggested media files can be returned to the user, such as being displayed on a display device associated with the user. The suggested media files may be displayed on a search results page, for instance. In one embodiment, prior to being communicated for display to the user, duplicate media files are determined and dropped from the list of suggested media files. A media file may be determined to be a duplicate of another media file if the length or size of the files is within a predetermined range. For instance, if a first video is one minute in length, and a second video is one minute and three seconds in length, the first and the second videos may be determined to be duplicates. The size of the files may be compared for image files that do not have a length. In one embodiment, the length or size of the files, combined with a finding that a set of sorted unique words in the titles of the videos are the same may lead to a determination that the files are duplicates. Returning to the example above, if the predetermined range is thirty seconds, then the first and second videos meet the first criteria for being duplicates. If the title of the first video is "Britney Spears" and the title of the second video is "Live Britney Spears in Washington," the set of sorted unique words is the same for both videos. In this case, the set of sorted unique words is {Britney, Spears}. As such, the two videos are determined to be duplicates of each other. In one embodiment, the media files that are found to be duplicates are stored and suggested to the user if a minimum threshold of media files is not met at the end of the process. In another embodiment, duplicate media files are discarded and not ever used as suggested media files. Other criteria may also be used to make a finding of duplicate media files in addition to or instead of the criteria described above. The criteria described above are not meant to be limiting but are provided for exemplary purposes only.

Moreover, in one embodiment, the titles of media files determined to be related are inspected to determine the cosine similarity between the titles. Cosine similarity essentially compares the words or alphanumeric strings in the titles to determine if the titles have one or more words in common. For example, if two titles do not have a single word in common, the cosine similarity is zero, and thus may not be considered related for purposes of embodiments of the present invention. However, in one instance, media files that have a cosine similarity of zero may be stored and used as suggested media files if a minimum threshold of media files cannot be met after attempting to identify related media files, as described herein. In many cases, media files having a cosine similarity of zero are considered "noise" and are stored for future use.

If, however, the number of media files does not meet the minimum threshold, a query is generated at step 616. The query may be gradually constructed, and may be based on the title and description of the media file, in one instance. For instance, the title of the media file may first be used as the query, and depending on the quantity of results retrieved, all or part of the description associated with the media file may be used as the query. In one instance, both the title and the description are used to generate the query. This could include all words or a portion of the words found in the title and description. Further, some media files have an associated category, such as a TV show, a movie, a trailer, news, comedy, etc., that describes what the media file represents. This information may be used to constrain the query. Even further, if the title of a media file contains a name of a known celebrity, TV show, movie, etc., this name is identified and used as the query. In this case, the results that are returned may be shuffled so that the same media files are not always suggested for a common celebrity, TV show, movie, etc.

In addition to attempting the queries described above, a relax count associated with the query may be implemented. A relax count allows one or more words of a query to be ignored, thus increasing the number of results that are returned. In one instance, if there are four words in the query, one word is ignored. If there are seven words in the query, two words are ignored. The words that are ignored may be purposefully determined, or may be selected at random each time a query is submitted. Moreover, the relax count (e.g., number of words that are ignored) may be predetermined based on the number of words in the query and may vary.

When the media files are returned based on the query, duplicate media files may be dropped. As described above, a media file may be determined to be a duplicate of another media file if the length or size of the files is within a predetermined range. For instance, if a first video is one minute in length, and a second video is one minute and three seconds in length, the first and the second videos may be determined to be duplicates. The size of the files may be compared for image files that do not have a length. In one embodiment, the length or size of the files, combined with a finding that a set of sorted unique words in the titles of the videos are the same may lead to a determination that the files are duplicates. Returning to the example above, if the predetermined range is thirty seconds, then the first and second videos meet the first criteria for being duplicates. If the title of the first video is "Britney Spears" and the title of the second video is "Live Britney Spears in Washington," the set of sorted unique words is the same for both videos. In this case, the set of sorted unique words is {Britney, Spears}. As such, the two videos are determined to be duplicates of each other.

In one embodiment, the media files that are found to be duplicates are stored and suggested to the user if a minimum threshold of media files is not met at the end of the process. In another embodiment, duplicate media files are discarded and not ever used as suggested media files. Other criteria may also be used to make a finding of duplicate media files in addition to or instead of the criteria described above. The criteria described above are not meant to be limiting but are provided for exemplary purposes only.

Moreover, in one embodiment, the titles of media files determined to be related are inspected to determine the cosine similarity between the titles. Cosine similarity essentially compares the words or alphanumeric strings in the titles to determine if the titles have one or more words in common. For example, if two titles do not have a single word in common, the cosine similarity is zero, and thus may not be considered related for purposes of embodiments of the present invention. However, in one instance, media files that have a cosine similarity of zero may be stored and used as suggested media files if a minimum threshold of media files cannot be met after attempting to identify related media files, as described herein. In many cases, media files having a cosine similarity of zero are considered "noise" and are stored for future use. In one embodiment, if more than a maximum number of media files, such as fifteen, are identified as being related to the selected media file, suggested media files are selected according to how relevant they are to the selected file, which may be determined by the relevancy score.

At step 618, it is again determined if the number of returned media files exceeds a minimum threshold of media files. If so, the suggested media files are returned to the user at step 622. Returning the suggested media files to the user may include communicating for display the suggested media files to the client device. If the number of media files returned from the query generated at step 616 in addition to the number of media files returned from extracting the media files from the data at step 612 still does not meet a minimum threshold of media files, a final query is generated, shown at step 620. The final query, in some instances, is the last attempt to retrieve related videos, and is generally more aggressive, as it favors coverage over precision.

Generating the final query includes the use of a Smith Waterman string similarity algorithm, which is used to detect a meaningful substring between the title and the description of the selected media file. If there is a matching substring in the title and description, that is used as the query. For instance, if the title of a media file is "Britney Spears" and the description is "Britney Spears is back," then the matching substring is "Britney Spears," and this is used as the query. Further, the relax count may be increased. For example, as described above, if a title has four words, the relax count is one. Now, it may be increased to two, which ignores two of the words in the title. This allows for more results to be returned from the query. In one embodiment, the words that are dropped may be predetermined based on the importance of the word. For example, words such as "the," "and," "if," "but," or even words that are common in everyday language may be dropped. This determination may be made by an algorithm, for example.

Moreover, duplicate results are dropped, similar to that described above. However, the length or size that is compared between two or more media files is decreased, which results in dropping less media files, thus producing more that can be returned to the user as suggested media files. For instance, if the difference in length of two separate videos is within thirty seconds, the related video is dropped (e.g., not included in the suggested videos). Now, however, as it is the last chance to identify related videos, the criteria of the difference in length may be dropped to ten seconds, for example. Other lengths of time are also contemplated to be within the scope of embodiments of the present invention. An additional step may determine if the number of media files returned from the final query generated at step 620 meets the minimum threshold. If it does not, the media files that have been dropped (e.g., determined to be duplicates) are retrieved from storage and added back so that the minimum number of media files returned to the user can be met. At step 622, the suggested media files are returned. This may include communicating to the client device the suggested media files for display.

Figure 7:
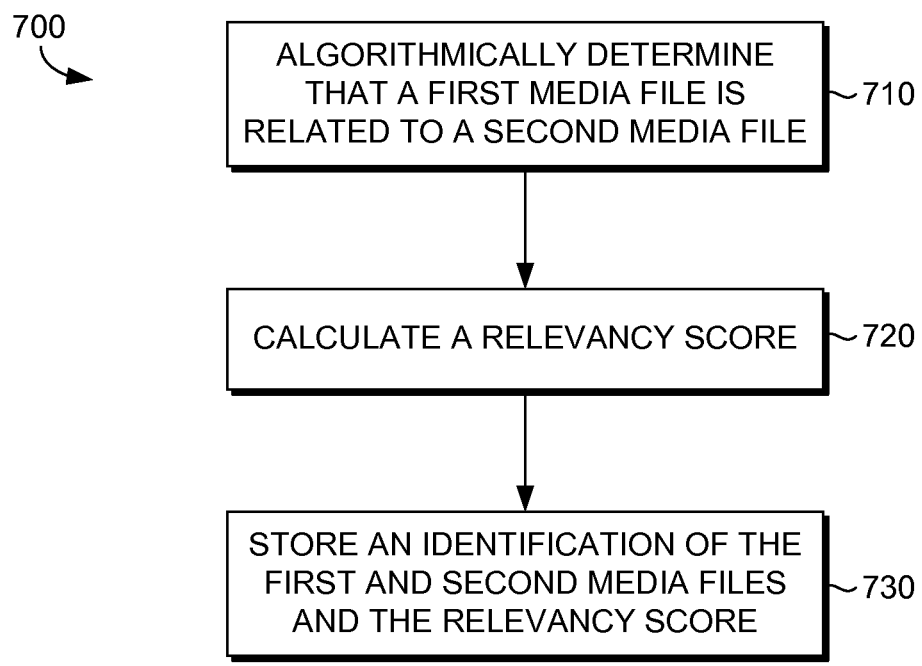
FIGS. 7-8 are flow diagrams showing various methods for determining related media files to suggest to a user, in accordance with embodiments of the present invention.

FIG. 7 is a flow diagram of a method 700 for determining related videos to suggest to a user, in accordance with an embodiment of the present invention. At step 710, it is algorithmically determined that a first media file is related to a second media file. The various algorithms are detailed herein, especially in relation to FIGS. 4 and 5. The first and second media files are related if they are both selected for viewing by a user in response to a user-submitted query (e.g., the random walk algorithm), or they are both selected by the user within a single session having a specified duration of time, such as fifteen minutes (e.g., the session algorithm). The first and second media files may both be selected in response to various queries. This strengthens the relationship between the two media files.

At step 720, a relevancy score is calculated. The relevancy score indicates a relevancy of the first media file in relation to the second media file, and is used to compare how related the first media file is to the second media file in relation to other media files that are also determined to be related to the first media file. The relevancy score is determined, in part, by a number of instances that the user selects the first and the second media files in response to the user-submitted query or within the single session. In one embodiment, the number of instances that a user selects the media files in a single session does not weigh on how relevant the two media files are to each other. Moreover, the relevancy score may be determined by determining a first click count for the first media file and a second click count for the second media file. These click counts represent the number of instances that a particular user selects the first and the second media files, respectively, in response to the user-submitted query or within the single session. The first click count is multiplied by the second click count to determine the relevancy score. A plurality of relevancy scores are determined for the first media file in relation to the second media file. These relevancy scores are summed to calculate a final relevancy score for the pair of media files.

This same process described above is performed for other pairs of media files determined to be related. For instance, it may be determined that the first media file is related to a third media file. The relevancy score for the first media file in relation to the third media file is calculated, and a plurality of relevancy scores for this pair are summed to obtain the final relevancy score. One pair of media files may be determined to be more related to each other than another pair. In one embodiment, this is determined by the relevancy score. For instance, the final relevancy score calculated for the first media file in relation to the second media file may be greater than the final relevancy score calculated for the first media file in relation to the third media file. In this case, the second media file is determined to be more related or relevant to the first media file than the third media file is to the first media file. In one instance, a user may submit a query to a search engine other than the search engine associated with the company that is determining the related media files. This may include website that allows users to upload videos, audio, or images for other users to select. Data associated with the media files, in that case, may be derived from a toolbar log.

At step 730, an identification of the first and the second media files, in addition to the relevancy score, are stored in, for instance, a searchable database. This data is stored, in one instance, as a binary trie file. As mentioned above, the media files include video, audio, images, or a combination thereof.

Figure 8:
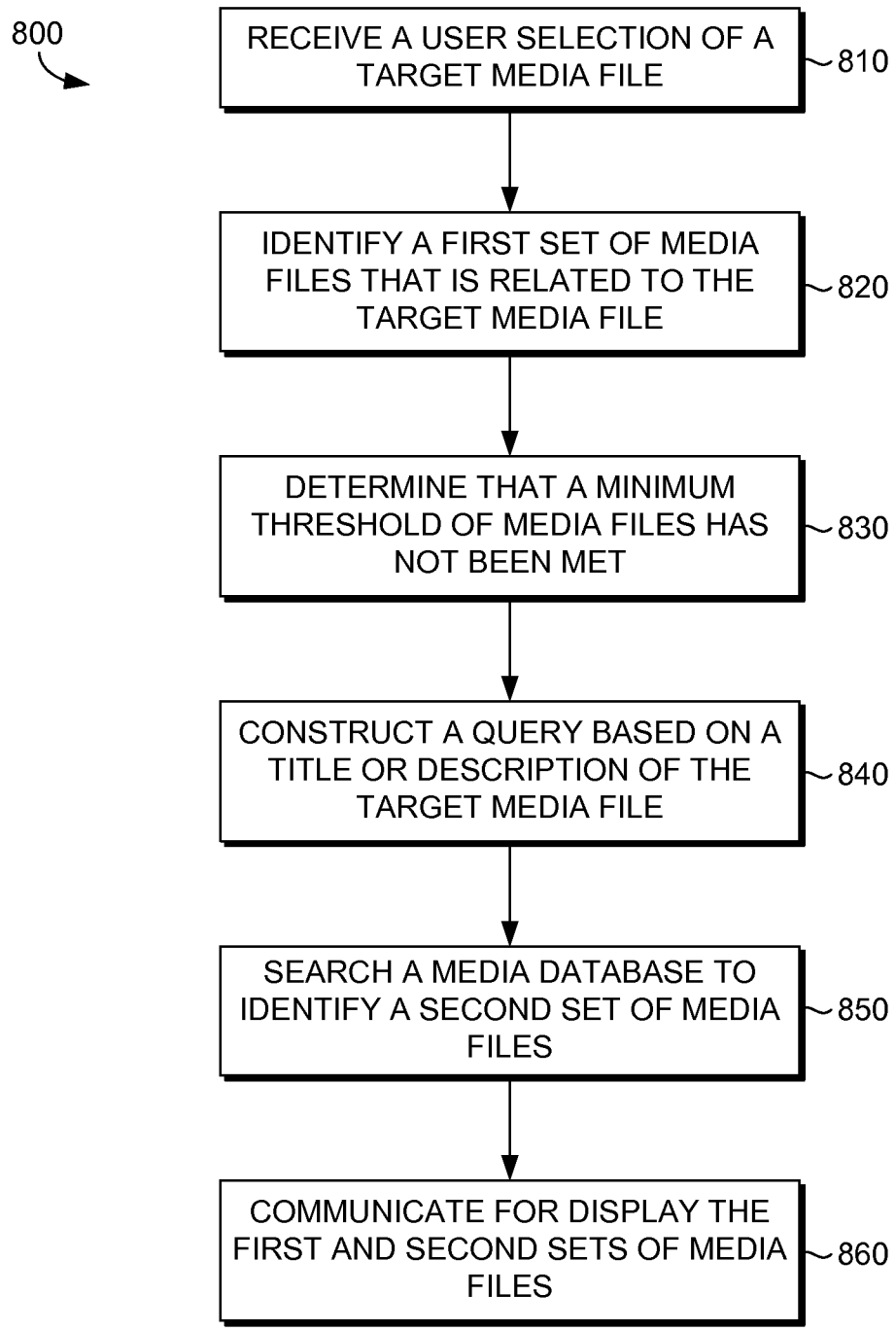

Turning now to FIG. 8, a flow diagram is shown of a method 800 for determining related videos to suggest to a user, in accordance with an embodiment of the present invention. Initially, a user selection of a target media file is received at step 810. At step 820, a first set of media files that is related to the target media file is identified. The first set of media files is identified for presentation to a user in response to the user selection of the target media file. In one instance, the first set of media files is identified by querying a database that contains identifications of the target media file and related media files, in addition to relevancy scores for each of the related media files indicating how relevant the related media files are in relation to the target media file. The database may be organized in a manner that indicates those media files that have been determined to be related to each other, such as organized in pairs of media files. The first set of media files is related to the target media file if the first set of media files and the target media file are selected by a user in response to a user-submitted query, or the first set of media files and the target media file are selected by the user within a single session having a specified duration of time.

At step 830, it is determined that a minimum threshold of media files has not been met. The minimum threshold may be any number, such as four media files, for instance. Thus, if at least four media files are not returned as being related to the target media file, step 840 is attempted. Step 840 indicates that a query is constructed based on a title or a description of the target media file. In one embodiment, a category (e.g., TV show, movie, comedy) is also used to construct the query. At step 850, a media database is searched to identify a second set of media files. The query constructed in step 840 is used to search for the second set of media files. Merged logs, search logs, toolbar logs, etc., may be searched to identify the second set of media files. At step 860, the first and second sets of media files, or at least a portion thereof, are communicated for display. If the number of media files found exceeds a maximum threshold (e.g., fifteen media files), for example, the number of media files are decreased so as to not overwhelm the user with too many suggested media files. In one instance, the media files are videos.

In one instance, duplicate media files are identified so as not to confuse the user with similar or the same suggested media files as the media file selected by the user. A media file may be determined to be a duplicate of another media file if the length or size of the files is within a predetermined range. In one embodiment, the length or size of the files, combined with a finding that a set of sorted unique words in the titles of the videos are the same may lead to a determination that the files are duplicates. Moreover, in one embodiment, the titles of media files determined to be related are inspected to determine the cosine similarity between the titles. Cosine similarity essentially compares the words or alphanumeric strings in the titles to determine if the titles have one or more words in common. For example, if two titles do not have a single word in common, the cosine similarity is zero, and thus may not be considered related for purposes of embodiments of the present invention. However, in one instance, media files that have a cosine similarity of zero may be stored and used as suggested media files if a minimum threshold of media files cannot be met after attempting to identify related media files, as described herein. In many cases, media files having a cosine similarity of zero are considered "noise" and are stored for future use. Further, as described above, one or more words of the query are ignored to broaden the query, thus providing more results. This may be done if too few results are returned as a result of the query.

Figure 9:
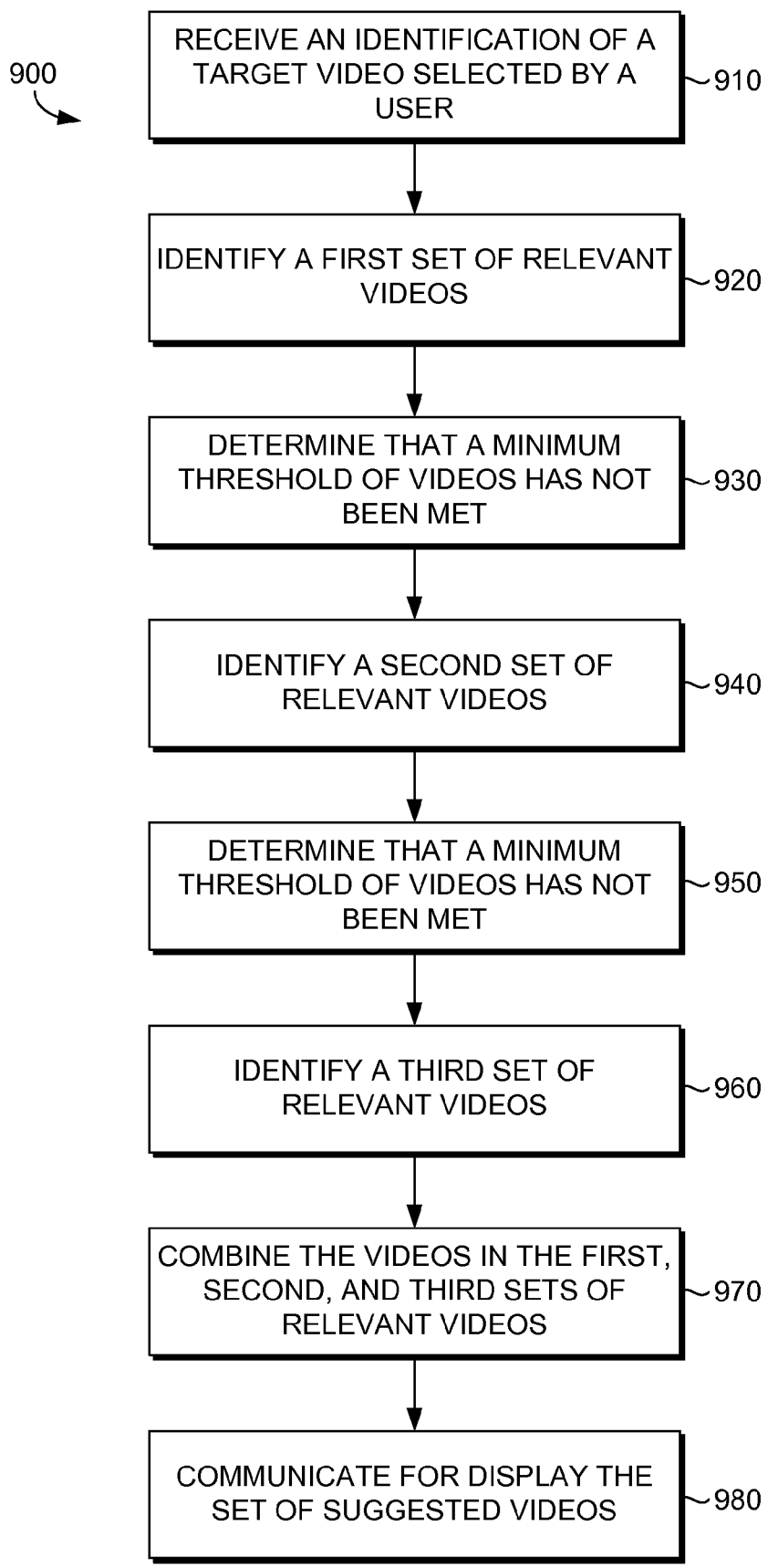
FIG. 9 is a flow diagram showing a method for determining related videos to suggest to a user, in accordance with an embodiment of the present invention.

Referring to FIG. 9, a flow diagram is illustrated of a method 900 for determining related videos to suggest to a user, in accordance with an embodiment of the present invention. Initially, at step 910, an identification of a target video that has been selected by a user is received. The identification, as referred to herein, may be a unique identifier that identifies videos or other media files. This allows for media files to be easily searched for in a database or the like. At step 920, a first set of videos is identified. A first query is used to identify the first set of videos. For instance, the query may include the identification of the target video, as discussed above. A database that includes an identification of videos and other media files that have been determined to be related to other videos and media files is searched using the first query. The first set of videos has previously been determined to be related to the target video. In one instance, the way that the first set of videos is determined to be related to the target video depends on whether the target video and videos in the first set of videos have been selected by previous users in a same session having a specified duration of time. This duration of time may be any amount of time, including, for example, fifteen minutes. Other durations of time are also contemplated to be within the scope of embodiments of the present invention. In another instance, videos are determined to be related based on a number of instances that the previous users have selected both the target video and the videos in the first set of videos in response to a search query. A detailed discussion of the determination of related videos is included herein in relation to FIGS. 3, 4, and 5.

At step 930, it is determined that a minimum threshold of videos has not been met. A quantity of videos in the first set of videos is used to make this determination as to whether there is a certain amount of videos that are to be presented to the user. As previously mentioned, the minimum threshold may be any number, such as four videos or media files, for example. At step 940, a second set of videos is identified using a second query. The second query is generated based on a title and/or a description of the target video. The second query, in some embodiments, is generated using other criteria, such as, for example, a category associated with the target video or a known name, such as a celebrity or a TV show that is included in the title or description of the target video. For instance, if "Britney Spears" is included in the title of the target video, a list of known celebrities is accessed, and any videos or other media files associated with the entry "Britney Spears" may be identified and used as suggested videos.

It is determined at step 950 that a minimum threshold of videos has not been met when the quantity of videos in the first set of videos is added to the quantity of videos in the second set of videos. At step 960, a third set of videos is identified based on a third query. The third query is generated based on common words in the title and the description of the target video. For instance, a Smith Waterman algorithm is applied, which is used to detect a meaningful substring between the title and the description of the media file, such as a video. If a matching substring is found, it may be used as the query. For instance, if a title of the target video is "Britney Spears," and a description of the target video is "Britney Spears performs in Kansas," the matching substring is "Britney Spears," and this will be used as the query. At step 970, the videos in the first, second, and third sets of videos are combined to form a set of suggested videos.

In one embodiment, videos in the set of suggested videos that are determined to be duplicates are dropped from the set. A video may be determined to be a duplicate of another media file if the length or size of the files is within a predetermined range. For instance, a first video is one minute in length, and a second video is one minute and three seconds in length. In one embodiment, the length or size of the files, combined with a finding that a set of sorted unique words in the titles of the videos are the same may lead to a determination that the files are duplicates. Moreover, in one embodiment, the titles of media files determined to be related are inspected to determine the cosine similarity between the titles. Cosine similarity essentially compares the words or alphanumeric strings in the titles to determine if the titles have one or more words in common. For example, if two titles do not have a single word in common, the cosine similarity is zero, and thus may not be considered related for purposes of embodiments of the present invention. However, in one instance, media files that have a cosine similarity of zero may be stored and used as suggested media files if a minimum threshold of media files cannot be met after attempting to identify related media files, as described herein. In many cases, media files having a cosine similarity of zero are considered "noise" and are stored for future use.

Returning to the example above, if the predetermined range is thirty seconds, then the first and second videos meet the first criteria for being duplicates. The first criteria, combined with a finding that a set of sorted unique words in the titles of the videos are the same may lead to a determination that the files are duplicates. The media files that are found to be duplicates are saved and may be suggested to the user if a minimum threshold of media files is not met at the end of the process described herein. At step 980, the set of suggested videos is communicated for display to, for example, the client device. In one embodiment, adult-related media files are only returned to a user if the query is also considered to be adult-related, and if a search option, such as a safe search option, is set to allow these media files to be returned.

As can be understood, embodiments of the present invention provide methods for identifying media files that are related to a selected media file. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media storing computer-useable instructions that, when used by one or more computing devices, causes the one or more computing devices to perform a method comprising:

algorithmically determining that a first media file is related to a second media file, wherein the first and the second media files are related if at least one of:
  (1) the first and the second media files are selected when presented in response to a user-submitted query, or
  (2) the first and the second media files are selected within a single user-session having a specified duration of time;

calculating a relevancy score that indicates a relevancy of the first media file in relation to the second media file and that is used to compare how related the first media file is to the second media file, wherein the relevancy score is determined, in part, by,
  (1) determining a first click count for the first media file and a second click count for the second media file, wherein the first and the second click counts represent the number of users who have selected the first and the second media files, respectively, in response to the user-submitted query or within the single session, and
  (2) multiplying the first click count by the second click count;

summing a plurality of relevancy scores that result from the first and the second media files being selected in response to a plurality of query instances, wherein a final relevancy score is obtained by summing the plurality of relevancy scores; and storing an identification of the first and the second media files and the associated relevancy score in a searchable database.

2. The one or more computer-storage media of claim 1, wherein the specified duration of time is fifteen minutes.

3. The one or more computer-storage media of claim 1, further comprising:
determining that the first media file is related to a third media file; and
calculating the relevancy score for the first media file in relation to the third media file.

4. The one or more computer-storage media of claim 3, further comprising summing a plurality of relevancy scores determined for the first media file in relation to the third media file to obtain a final relevancy score.

5. The one or more computer-storage media of claim 4, further comprising determining that a final relevancy score for the first media file in relation to the second media file is greater than the final relevancy score for the first media file in relation to the third media file.

6. The one or more computer-storage media of claim 5, further comprising determining that the second media file is more relevant to the first media file than the third media file is to the first media file.

7. The one or more computer-storage media of claim 1, wherein the user-submitted query is submitted to a search engine, and wherein data associated with the first and the second media files is derived from a toolbar log.

8. The one or more computer-storage media of claim 1, wherein the identifications of the first and the second media files and a final relevancy score are stored as a binary trie file.

9. The one or more computer-storage media of claim 1, wherein the first and the second media files are videos.

* * * * *